Feb. 1, 1966 R. X. MEYER 3,232,046
PLASMA GENERATOR AND PROPULSION EXHAUST SYSTEM
Filed June 6, 1962

INVENTOR.
RUDOLF X. MEYER
BY David P. Ogden
ATTORNEY

United States Patent Office 3,232,046
Patented Feb. 1, 1966

3,232,046
PLASMA GENERATOR AND PROPULSION
EXHAUST SYSTEM
Rudolf X. Meyer, Pacific Palisades, Calif., assignor to
The Aerospace Corporation, Los Angeles, Calif., a
corporation of California
Filed June 6, 1962, Ser. No. 200,551
5 Claims. (Cl. 60—35.5)

The present invention relates to magnetohydrodynamics and more particularly to a high-specific-impulse engine suitable for space operation.

Magnetohydrodynamic prior art includes several proposed plasma (i.e., ionized macroscopically neutral gas) thrust devices arranged to accelerate plasma to high velocities suitable for space vehicle propulsion. Although the thrust of such engines is relatively small, the efficiency of propellant utilization is high and the thrust is sufficient, in principle, to accelerate a vehicle from orbital velocity to velocities required for deep-space missions. Specific impulses as high as 10,000 seconds are contemplated. The prior art plasma propulsion engines typically utilize a high gas density of the order of $10^{16}$ or more particles per cubic centimeter. As a result, the mean-free path of each particle is small compared to the dimensions of the engine.

On the other hand, if the mean-free path can be comparable or large compared to the dimesions of an engine, modes of operation substantially different from prior art engines becomes feasible. These new modes of operation are now feasible for use in very high-specific-impulse engines when operated at a relatively small power level. Such devices are particularly valuable for attitude stabilization and attitude control of orbital vehicles. Since such vehicles must be placed in orbit with very strict weight limitations, a light-weight efficient engine is needed. Since only small power levels are required in these applications, the gas density can be much lower and the mean-free path much larger without encountering excessive weight problems.

It is therefore, an object of my invention to provide a new and improved high-specific-impulse space engine which is not subject to a mode of operation limited by small mean-free paths of the particles being accelerated.

According to one embodiment of the present invention, an anode of cylindrical shape and a cathode made of refractory metal are arranged within a uniform longitudinal magnetic field. A propellant (such as hydrogen) is admitted near the cathode. An electric discharge takes place between the cathode and an anode within the magnetic field. Its nature is similar to the one of a Phillips ionization gauge discharge, except that instead of a second cathode, a so-called magnetic mirror is formed (by an increased field strength near the nozzle end of the engine). Electrons emitted from the cathode spiral around the magnetic lines of force. Most of them are reflected by the magnetic mirror to become trapped in the region between the cathode drop and the magnetic mirror. When they suffer a collision, they will spiral about a new field line and eventually reach the anode. Positive ions also spiral about the field lines, although with a larger radius of gyration. They are also reflected at the magnetic mirror but some will escape to provide the primary driving force (those which enter the so-called escape cone of the mirror). In the downstream direction of the mirror, the magnetic field strength falls to zero. The radius of gyration of the escaped electrons and ions increases. It follows from the laws of motion of charged particles in a magnetic field that the axial velocity increases, whereas the azimuthal velocity decreases.

The subject matter which is regarded as this invention is particularly pointed out and distinctly claimed in the concluding portion of the specification. The invention, however, as to its organization and operation, together with further objects and advantages thereof, will best be understood by reference to the following description taken in connection with the accompanying drawings in which:

Figure 1:
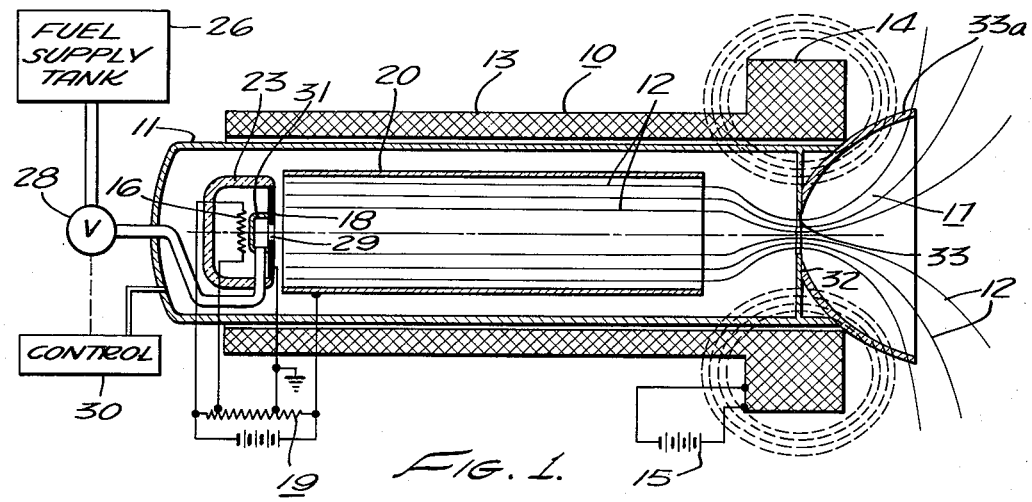
FIG. 1 is a schematic cross-sectional view of one embodiment of the present invention.

Referring now to the drawing wherein like numbers refer to similar parts, in FIG. 1, high-specific-impulse engine 10 comprises an inner housing 11 which lies within the influence of a magnetic field 12 generated by a field winding 13.

An important element of my invention is the magnetic field 12. At one end of the field winding 13 is provided an enlarged winding portion 14 arranged to generate increased magnetic flux to effectively compress the lines of magnetic force and thus establish the "magnetic mirror" of the engine 10. The field winding 13 is energized from a D.-C. power supply 15. The rear portion of the magnetic mirror of the present invention forms a nozzle 17 which will be discussed in greater detail below.

In the engine of the present invention, ions are created primarily by collision between neutral particles and free electrons. Moreover, both the ions and the particles are energized by elastic collisons with the free electrons. A cathode heater 16 maintains a refractory cathode 18 at a temperature of the order of 2000° C. to emit a large number of electrons. The heater 16 itself is enclosed in an evacuated tube 23 so that it is not subject to erosion by ion or particle bombardment. The heating of the cathode 18 is accomplished by electron bombardment by the electrons emitted from the heat 16 which are attracted to the cathode 18 at high velocities. These velocities are attained by the provision of a voltage differential of the order of 1,000 volts between the heater 16 and the cathode 18, in accordance with the voltage of a power supply 19. A voltage differential is provided between the cathode 18 and a cylindrical anode 20. This results in the provision of a voltage difference of the order of 100 volts in the region of the cathode, usually referred to as a cathode drop. As a result of this cathode drop, electrons escape from the cathode 18 only at substantial energy levels.

Figure 2:
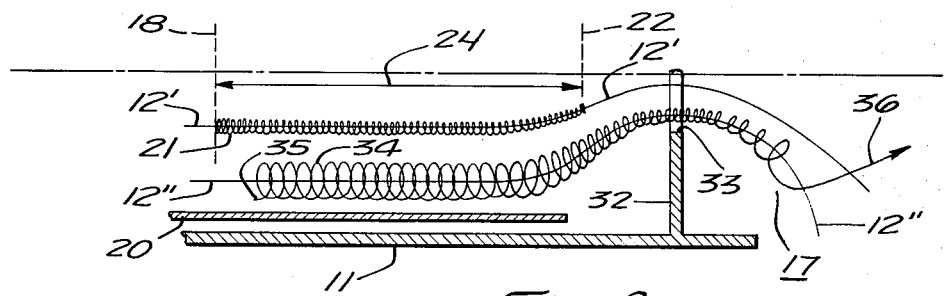
FIG. 2 is a schematic representation of typical paths of an electron and a positive ion along respective magnetic lines of force.

The electrons escaping from the cathode 18 toward the region of the magnetic mirror nozzle 17 will gyrate around one of the magnetic lines of force as shown in FIG. 2 at 12'. For example, one electron will travel at a substantially constant longitudinal velocity in a gyrating path 21 until it reaches a region 22 which is subject to the effects of the magnetic mirror and where it will be reflected. Although some electrons will escape through the magnetic mirror nozzle 17, most will be reflected and will maintain their longitudinal velocity until they are again influenced by the cathode drop whereby they are again reflected. Because of the trapping by multiple reflection of electrons between the cathode drop and the magnetic mirror, a substantial number of them will be spiraling at substantial energy levels within the region indicated by the double ended arrow 24. In fact, they will remain at constant energy levels until they collide with one another or with other particles. Because of such collisions, the electrons will eventually reach the anode 20, but some of the electrons will escape and be ejected by the magnetic mirror nozzle 17. Any such escaping electrons will provide a minor portion of the engine thrust and will eliminate any electrostatic field which might tend to trap the driving ions discussed below.

The primary driving force of the present engine is developed through the emission of positive ions derived from the propellant gas. The propellant gas originates from a supply tank 26 through a pressure-reducing valve arrangement 28 into the engine housing through a central aperture 29 of the cathode 18. The valve 28 is controlled by a pressure control arrangement 30 which is sensitive to the pressures within the engine 10 and will maintain a particle density of the order of $10^{14}$ per centimeters$^3$. Such a particle density is equivalent to a pressure of the order of a few microns.

The admission of the propellant particles through the relatively small aperture 29 in the cathode 18 effectively heats the neutral particles of the propellant through heat exchanger action of the cathode 18 and a relatively small cap 31. One metal that is suitable for use as a cathode 18 is tantalum which may also be used to fabricate the cap 31. By using tantalum and electron bombardment heating, temperatures of the order of 2500° C. are easily attainable. Thus both the electrons and the neutral particles will leave the cathode 18 at about this energy level. However, the electrons pick up the major portion of their energy in traversal of the cathode drop. The neutral particles, on the other hand, are not materially influenced by the cathode drop.

In an engine 10 having dimensions of about twenty centimeters length and five centimeters diameter, a particle density of $10^{14}$ per centimeter$^3$ will result in a mean-free path of the neutral particles which is greater than the length of the engine. Thus, the particles, as long as they remain uncharged, move in straight lines through and across the housing 11. A few of the heated neutral particles will tend to pass through the end of the engine 10 and escape. However, most will be prevented from escaping by a baffle 32, whereby they will be reflected into the housing. Those neutral particles which do escape through the central aperture 33 of the baffle 32 provide some thrust because of their escape velocity. This thrust can be utilized most effectively by providing a reflector 33a. Thus, high temperature neutral particles escaping through the aperture 33 will be deflected rearwardly from the reflector 33a.

Obviously, with the large number of electrons trapped in the central portion 24 of the housing 11, there will be numerous elastic collisions between electrons and particles. Additionally, a portion of the propellant gas particles will be ionized because of ionizing collision with the electrons. When so ionized these ions will also spiral about magnetic lines of force. Those ions which escape through the magnetic mirror nozzle 17 provide the primary thrust of the engine 10.

The elastic collisions between the electrons and neutral particles (and to some extent ions) impart energy to the particles. However, the major energization of the propellant gas is accomplished by ionization. Temperatures of 50,000° K. are typical. Those ions which escape through the cone of the magnetic mirror provide a substantial and efficient driving force. However, even at these energy levels many ions will not be within the escape cone of the magnetic mirror and will be reflected thereby to fall into the cathode 18. With the energy of the ions impinging upon the cathode 18, they will provide additional electrons through the process of secondary electron emission. The ions contacting the cathode 18 are neutralized. Such neutralized ions, now particles, will again repeatedly cross the trapped electron region at energy levels substantially the same as those being admitted through the aperture 29. Eventually, the particles will either escape or be ionized to escape from the engine at high velocities. Typical ion escape velocities are $5 \times 10^6$ centimeters per second.

Referring again to FIG. 2, a typical gyrating trajectory 34 of an escaping ion is indicated relatively to a magnetic line of force 12″ as shown the particle became ionized at a point 35. The pitch of the helical trajectory 34 is a function of the ion velocity and the strength of the magnetic field so that it is a much tighter spiral in the regime of the magnetic mirror than throughout the length of the engine 10 where the magnetic force is substantially uniform. In one arrangement of my invention, the uniform magnetic field strength is about 1,000 gauss and the magnetic mirror field strength is about 5,000 gauss.

As is the normal configuration of the magentic lines of force, they diverge at the end of the field winding 13 where the magnetic field strength falls toward zero. External to the engine 10 in the region of the magnetic mirror nozzle 17, the magnetic line of force 12″ is such that the ion will escape rearwardly as indicated by an arrow 36. This is because the ion's axial velocity increases, whereas its azimuthal velocity decreases. The thermal energy of the ion is thereby converted directly into directed kinetic energy. Although the basic physical mechanism in the region of the magnetic mirror nozzle 17 is entirely different, the result in thrust is analogous to a conventional supersonic nozzle.

As will become apparent to those familiar with this art, the preferred particle density is a function of the dimensions of the engine housing 11. The density should be such that the likelihood of collisions between neutral particles and between ions is small for a single passage through the space of the engine. On the other hand, many electrons are trapped between the cathode 18 and the magnetic mirror. Therefore, electrons will collide with neutral particles and eventually impart thermal energy to them and ionize them.

The best mode of operation of my invention is subject to many interdependent considerations. Starting with the baffle 32, its central aperture 33, should be as small as feasible to reduce to a minimum the probability of escape of neutral, relatively low energy particles. The compression of the magnetic field 12 in the region of the baffle 32 should be sufficient to funnel a large portion of the high energy ions through the baffle aperture 33. This compression is also considered relative to the electron energies to allow the reflection by the magnetic mirror of most electrons into the entrapment region 24.

With the particular dimensions presented above, my invention requires about one kilowatt energy during operation and provides about a five gram thrust. However, the power efficiency is substantially increased by using a cluster of these engines and mutually coupling the magnetic field arrangements. Similarly, a cluster will provide relative weight reduction in the fuel supply arrangement, as a single fuel tank and a single pressure-reducing valve can easily supply propellant gas to several engine housings.

Figure 3:
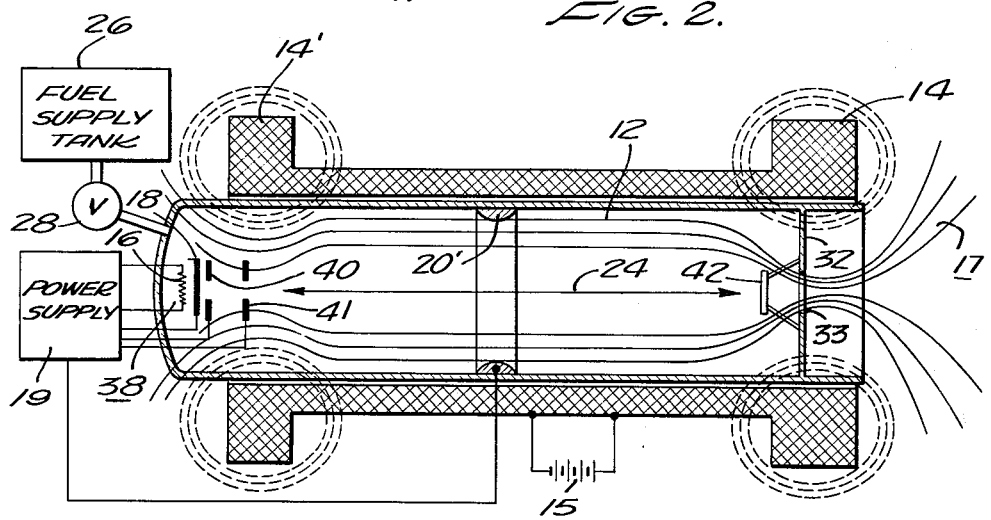
FIG. 3 is a schematic cross-sectional view of another embodiment of the present invention.

Obviously several other operating arrangements are feasible with the present invention. For instance, it is feasible to prevent a major portion of the ions of the system from reaching the cathode 18. Referring now to FIG. 3, I have shown an arrangement utilizing two magnetic mirrors with the second mirror being a somewhat weaker one as a result of a slightly smaller enlarged portion 14′ of the field winding 13. Thus most of the ions which are reflected by the magnetic mirror nozzle 17 will be again reflected by the magnetic mirror created by the enlarged portion 14′ whereby they will not fall into the cathode 18 to be neutralized. Utilizing this type of arrangement, I prefer to inject electrons into the entrapment region 24 by an electron gun 38 which projects electrons directly through the center of the weaker magnetic mirror at a relatively low velocity. The electron gun is essentially the same as the heater 16 and the refractory cathode 18 discussed above with the addition of an accelerating electrode 40 to enhance focusing the electrons and a decelerating electrode 41, which will slow the electron beam and enhance dispersion and scattering so that most of the electrons do not travel within the escape cone of the magnetic mirror nozzle 17. The electron gun 38 is arranged to project electrons with just enough energy to navigate the cone of the nearest magnetic mirror, whereupon if they suffer dispersion forces or even minor elastic collisions, within the entrapment region 24 they cannot escape from the system except by contact with an annular anode 20'.

Also, in FIG. 3 I have shown an additional baffle portion 42, placed in front of the aperture 33 to restrict further the escape of neutral particles. With such a baffle arrangement the ions tend to follow curved magnetic lines and pass between the baffles 32 and 42 while neutral particles follow straight trajectories and are not thus focused through the aperture 33.

While I have shown and described particular embodiments of the present invention, further modifications may occur to those skilled in this art. For instance, the electrons can be supplied by a central filament within the entrapment region 24. If such a filament is used in connection with the plasma engine of FIG. 3, the winding portion 14' can be larger than the winding portion 14 whereby substantially no ions will be lost from the entrapment region. Moreover, the baffling arrangement may be made much more complex to reduce to a minimum loss of any neutral particles. One simple approach is to make the mirror region thicker and the baffle aperture 33 thicker and with annular grooves, arranged to reflect nearly all of the particles which impinge thereon. It is intended, therefore, by the appended claims to cover all such modifications that come within the true spirit and scope of the present invention.

What I claim is:

1. A high specific-impulse space engine comprising:
an inner housing having a restricted aperture only at one end;
a field winding surrounding said inner housing and arranged to provide a substantially uniform magnetic field regime throughout a major portion thereof and an increased magnetic mirror field coplanar with the aperture of said one end and having an escape cone which enhances ion flow through the aperture;
means arranged to provide free electrons within said uniform magnetic field regime;
an annular anode positioned around said uniform magnetic field regime and arranged eventually to receive substantially all of the electrons admitted to said regime;
means for reflecting said electrons toward said magnetic mirror;
said reflection means, said anode and the magnetic mirror cooperating to entrap substantially all of the electrons which follow a gyrating path within said uniform magnetic field regime; and
means for introducing ionizable particles into the entrapment region to be bombarded and energized by the entrapped electrons, said electrons being of sufficient energy to ionize said particles whereby at least a portion of the resulting ions will gyrate around a line of magnetic force throughout the engine to egress through the escape cone and the restricted aperture and escape rearwardly from the engine.

2. A high specific-impulse engine comprising:
means for providing a substantially uniform longitudinal magnetic field throughout a major portion of the engine, said field having a field-strength sufficient to entrap energized electrons;
means for injecting high energy electrons into the engine;
means for substantially increasing the magnetic field at one end of the engine to thereby provide a magnetic mirror having a central escape cone, said magnetic mirror being arranged to reflect substantially all energized electrons impinging thereon;
means remote from said magnetic mirror for reflecting said electrons and cooperating with magnetic field and mirror to define an entrapment regime;
means for injecting ionizable molecules into the entrapment regime;
means for containing said molecules so that they tend to repeatedly cross said entrapment regime whereby they will suffer energizing elastic collisions with the electrons, and from time to time will be ionized thereby, said magnetic mirror acting to prevent escape of ions having other than those being in a predetermined range of velocities;
baffle means at said magnetic mirror reflecting back into the entrapment regime all ionizable molecules travelling axially of the engine, said baffle means having an aperture coincident with the central escape cone and through which aperture and cone flow molecules that are ionized.

3. A high specific-impulse space engine having a nozzle end and comprising:
an inner housing having a restricted outlet aperture only at the nozzle end;
a field winding arranged to provide a substantially uniform magnetic field regime throughout a major portion of said inner housing and an increased magnetic mirror field coplanar with the aperture of the nozzle end and having an escape cone enhancing escape of ions only coaxial with the aperture;
means arranged to provide free electrons to said uniform magnetic field regime at velocities such that substantially all are reflected by said magnetic mirror;
an annular anode positioned within said uniform magnetic field regime and arranged eventually to receive substantially all of the electrons admitted to said regime;
means for reflecting said electrons toward said magnetic mirror;
said reflection means, said anode and said magnetic mirror cooperating to entrap substantially all of the electrons within said uniform magnetic field regime; and
means for introducing ionizable particles at elevated temperatures into the electron entrapment region to be bombarded and energized by the entrapped electrons, said electrons being of sufficient energy to ionize said particles whereby at least a portion of the resulting ions will gyrate around a line of magnetic force throughout the engine to egress through the escape cone and escape through the restricted aperture rearwardly from the engine, said magnetic mirror operating to direct ions rearwardly of the engine.

4. A high specific-impulse space engine having a nozzle end and comprising:
means arranged to provide a substantially uniform magnetic field throughout a major portion of the engine;
means arranged to provide a substantially increased magnetic mirror field at each end of the engine;
said magnetic mirrors having central escape cones;
first baffle means coplanar with the one of said magnetic mirrors at the nozzle end and defining a central aperture receptive of highly energized ions;
means for injecting electrons into an entrapment region established by said fields;
means for supplying ionizable particles to the engine at a low pressure density, the density being selected so that particle mean free path length is comparable to the maximum inner dimension of the engine;
means for substantially enclosing all portions of the engine with the exception of the central aperture of said first baffle means; and
additional baffle means cooperating with the central aperture to selectively inhibit escape of said particles without interfering with at least some energized ions to prevent loss of substantial numbers of said particles whereby the trapped electrons will effectively bombard and energize said particles, said electrons being of sufficient energy to ionize from time to time each of said particles whereby at least a portion of the resulting ions will gyrate around a line of magnetic force throughout the engine to escape through the central aperture and be ejected rearwardly from the engine by the divergent magnetic field at the nozzle end.

5. A high specific-impulse space engine having a nozzle end and comprising:
  means arranged to provide a substantially uniform magnetic field throughout a major portion of the engine;
  means arranged to provide a substantially increased magnetic mirror field at the nozzle end of the engine;
  said magnetic mirror having a central escape cone;
  first baffle means coplanar with said magnetic mirror having a central aperture receptive of highly energized ions;
  means for injecting electrons into an entrapment region established by said fields;
  means for supplying ionizable particles to the engine;
  means for substantially enclosing all portions of the engine with the exception of the central aperture of said first baffle means; and
  additional baffle means cooperating with the central aperture to inhibit escape of said particles without interfering with the passage of some energized ions through the central aperture of said first baffle means.

References Cited by the Examiner

UNITED STATES PATENTS

| | | | |
|---|---|---|---|
| 2,809,314 | 10/1957 | Herb | 313—631 |
| 2,892,114 | 6/1959 | Kilpatrick | 313—631 |
| 3,025,429 | 3/1962 | Gow et al. | 175—4 |

OTHER REFERENCES

Missiles and Rockets, June 19, 1961, pages 25 and 26.
Astronautics, October 1959, pages 23, 24 and 25.
Space Aeronautics, vol. 33, No. 5, May 1960, pages 42–45.

MARK NEWMAN, *Primary Examiner.*
SAMUEL LEVINE, *Examiner.*